July 1, 1941.  G. C. PAPENDICK  2,247,697
MECHANISM FOR FRACTIONATING SLICED BAKED BREAD LOAVES
Filed April 24, 1939  3 Sheets-Sheet 1
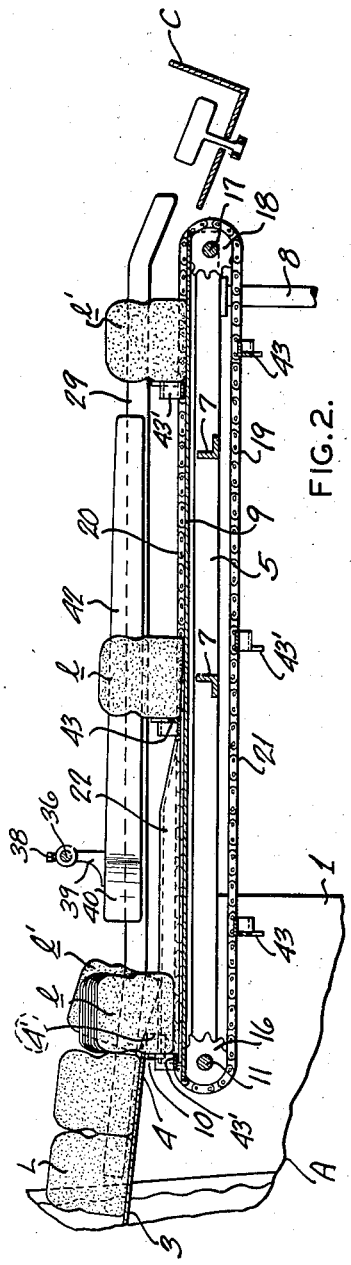
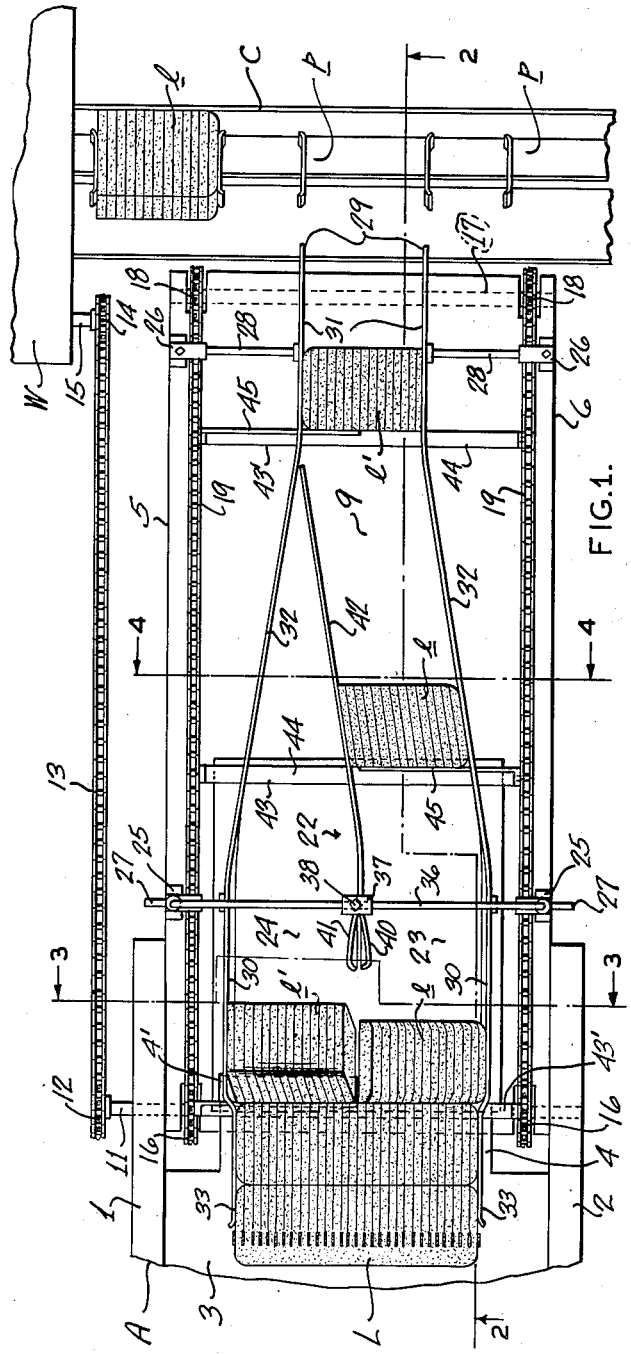
INVENTOR
GUSTAV C. PAPENDICK
BY
ATTORNEY July 1, 1941.   G. C. PAPENDICK   2,247,697
MECHANISM FOR FRACTIONATING SLICED BAKED BREAD LOAVES
Filed April 24, 1939   3 Sheets-Sheet 2

INVENTOR
GUSTAV C. PAPENDICK
ATTORNEY

July 1, 1941.  G. C. PAPENDICK  2,247,697

MECHANISM FOR FRACTIONATING SLICED BAKED BREAD LOAVES

Filed April 24, 1939  3 Sheets-Sheet 3

INVENTOR
GUSTAV C. PAPENDICK
BY
ATTORNEY

Patented July 1, 1941

2,247,697

UNITED STATES PATENT OFFICE 2,247,697

MECHANISM FOR FRACTIONATING SLICED BAKED BREAD LOAVES

Gustav C. Papendick, University City, Mo.; Elizabeth Papendick, executrix of Gustave C. Papendick, deceased, assignor to Papendick, Inc., St. Louis, Mo., a corporation of Missouri Application April 24, 1939, Serial No. 269,807

27 Claims. (Cl. 146—153)

This invention relates to certain new and useful improvements in mechanism for fractionating sliced baked bread loaves and is generally related to the subjects-matter of my co-pending patent applications Serial Nos. 242,430, 242,431, 242,432, 242,433, and 242,434, all filed November 25, 1938.

My present invention has for its primary objects the provision of means which will automatically subdivide successive sliced baked bread loaves into a plurality of fractions in a simple, speedy, and efficient manner without materially adding to production cost of the bread loaves, and which will fractionate or subdivide the sliced bread loaves at high speed in timed relation to the other bread production processes.

And with the above and other objects in view, my invention resides in the novel features of form, construction, arrangement, and combination of parts presently described and pointed out in the claims.

In the accompanying drawings (3 sheets):

Figure 1 is a plan view of a sliced baked bread loaf fractionating mechanism constructed in accordance with and embodying my present invention;

Figure 2 is a longtudinal sectional view of the machine, taken approximately along the line 2—2, Figure 1;

Figure 3:
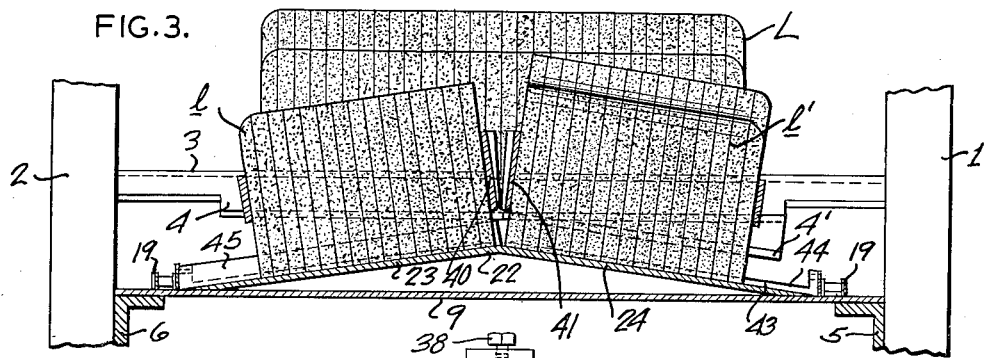
Figure 4:
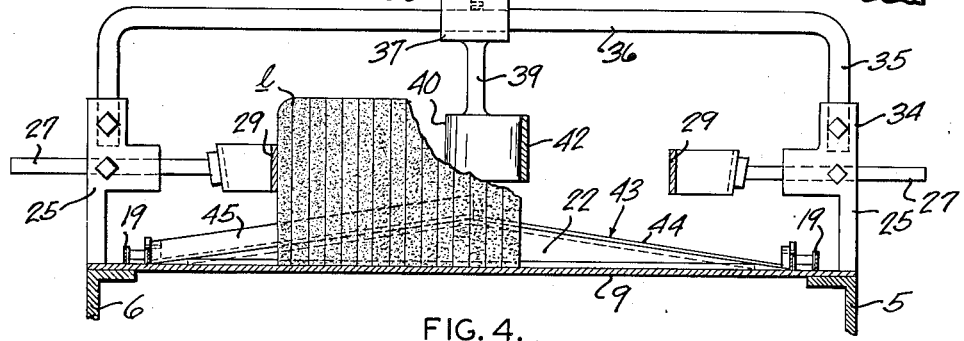
Figure 5:
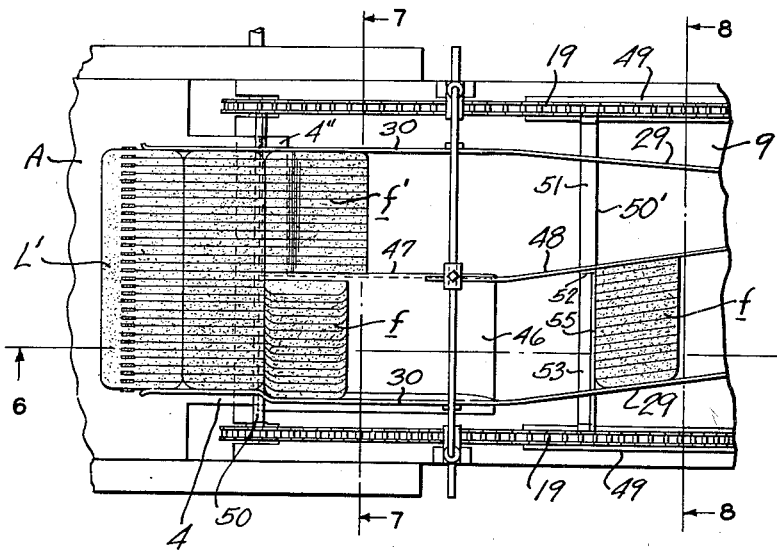
Figure 6:
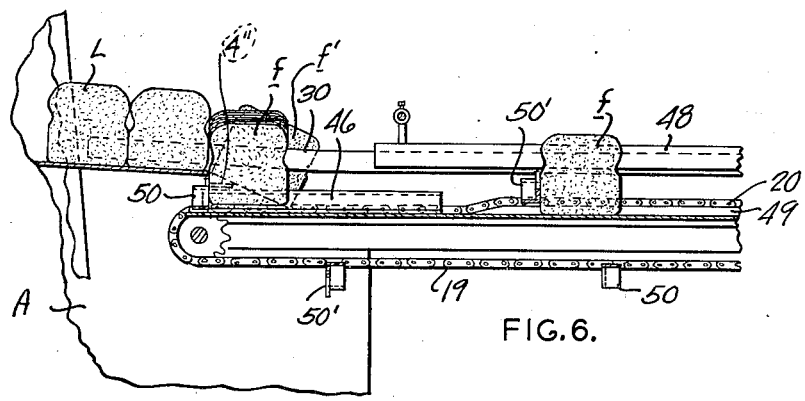
Figure 7:
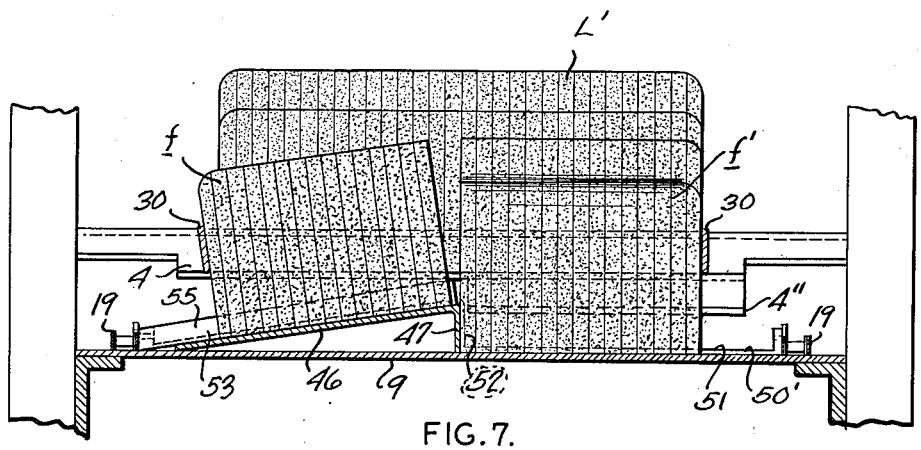
Figure 8:
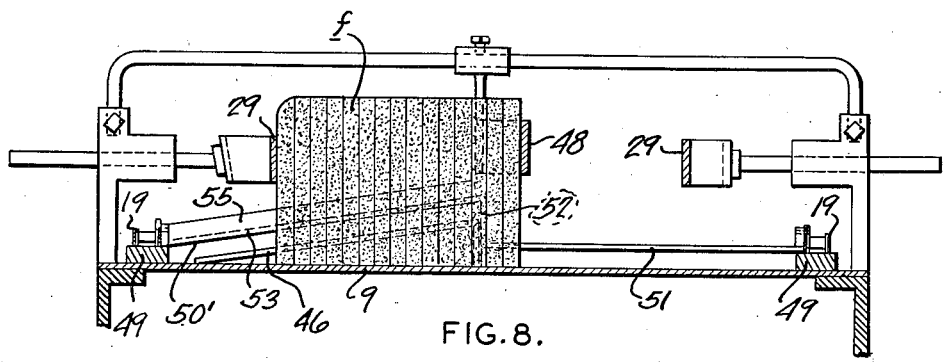

Figures 3 and 4 are transverse sectional views of the machine, taken approximately along the lines 3—3 and 4—4, respectively, Figure 1, Figure 5 is a fragmentary plan view of a slightly modified form of sliced baked bread loaf fractionating mechanism embodying my present invention;

Figure 6 is a fragmentary longitudinal sectional view of the mechanism, taken approximately along the line 6—6, Figure 5; and Figures 7 and 8 are transverse sectional views of the modified mechanism, taken approximately along the lines 7—7 and 8—8, respectively, Figure 5.

Referring now in more detail and by reference characters to the drawings, which illustrate practical embodiments of my present invention, A generally designates a baked bread loaf slicing machine preferably of the vertically reciprocating knife-blade type, which includes a pair of opposed side frames 1, 2, and a conventional grid plate 3, the latter extending transversely between the side frames 1, 2, at the discharge end of the machine and having a preferably integral forwardly projecting delivery lip 4 provided across half of its width with a downwardly and forwardly projecting hold-up tongue 4', as best seen in Figure 3 and for purposes presently more fully appearing.

Mounted rigidly on, and extending forwardly from, the side frames 1, 2, is a pair of opposed parallel side panels 5, 6, transversely connected across by a plurality of parallel preferably angle-iron members 7 and supported at their forward end by leg members 8.

Mounted along its opposite longitudinal margins upon, and extending horizontally between, the side panels 5, 6, is a conveyor table 9 projecting at its rear end beneath, and being spaced downwardly from, the forward margin of the delivery lip 4 in the provision of a clearance gap 10, all as best seen in Figure 2 and for purposes presently appearing.

Extending horizontally beneath the rear extremity of the conveyor table 9, and journaled at its one end in the side panel 6 and at its other end journaled in and projecting through both the side panel 5 and the side frame 1, is a drive shaft 11 provided on its projecting end with a driving sprocket 12 connected by means of a conventional sprocket chain 13 to a sprocket 14 pinned or otherwise fixed upon the projecting end of a main drive shaft 15 of a conventional wrapping machine W. Intermediate its journaled ends and preferably adjacent the inwardly presented faces of the panels 5, 6, respectively, the shaft 11 is provided with a pair of sprockets 16, all as best seen in Figures 1 and 2 and for purposes presently appearing.

Similarly journaled at its ends in the side panels 5, 6, and extending horizontally beneath the forward end of the table 9, is an idler shaft 17 provided with a pair of sprockets 18 respectively positioned in peripheral alignment with the sprockets 16, and trained over the peripherally aligned pairs of sprockets 16, 18, is a pair of endless conveyor chains 19, each having an upper forwardly traveling run 20 extending over the upper face of, and a lower return run 21 extending under, the table 9, all as best seen in Figure 2 and for purposes presently fully appearing.

Welded or otherwise fixed upon the upper face, and disposed along the rear portion, of the table 9, is a divider plate 22 transversely bent along its longitudinal center line in the provision of two oppositely disposed obliquely downwardly inclined or beveled plane-surfaced slides 23, 24. The plate 22 at its rear end projects beneath the forward margin of the delivery lip 4, and at its forward margin is curved or tapered downwardly across its entire width into a horizontal plane substantially contiguous to the upper face of the table 9.

Mounted on the upwardly presented flat faces of the side panels 5, 6, are opposed pairs of axially aligned sleeves 25, 26, for shiftably supporting pairs of transversely disposed aligning guide rods 27, 28, welded or otherwise fixed on the inner ends of which, are opposed longitudinally extending track-defining rails 29, each including rear and forward straight sections 30, 31, respectively extending in substantial parallelism with the longitudinal axis of the table 9 and intermediate sections 32 extending obliquely or angularly inwardly from the rear straight sections 30 to the forward straight sections 31, which latter are hence disposed more closely together than are the rear straight sections 30. At their rear end, the straight sections 30 are further provided with preferably integrally inwardly offset straight sections 33, which lie in a plane substantially perpendicular to the plane of the discharge lip 4. The rear straight sections 30 are also bent obliquely to extend in a plane substantially perpendicular or at right angles to the subjacent oblique portions 23, 24, of the divider plate 22. The intermediate longitudinally oblique sections 32, on the other hand, are bent backwardly into a plane substantially perpendicular to the face of the table 9, all as best seen in Figure 1 and for purposes presently appearing.

The sleeves 25 are each provided with a preferably integral upwardly presented socket 34 for supportingly receiving the ends of a U-shaped bridge 35 having a bight 36 disposed transversely over the table 9, and shiftable on the bight 36, is a hanger collar 37, thread-seated upon which for engaging the bight 36 for securing the collar 37 in any adjusted position along the bight 36, is a set-screw or the like 38. Formed preferably integrally with, and depending from, the collar 37, is a hanger bar 39 provided at its lower extremity with a pair of obliquely opposed intermediate divider guides 40, 41, extending over and along the ridge-like center line of the divider or breaker plate 22 in perpendicular disposition to the planes of the oppositely oblique loaf slides 23, 24. At their forward end, the guides 40, 41, are convergingly bent and merge into a single forwardly extending flexible swinging guide or switch member 42, which is adapted to be swung by the respective traveling loaf fractions alternately into parallelism with first one and then the other of the intermediate oblique guide or rail sections 32, as more fully described and disclosed in my co-pending application Serial No. 242,430 and as best here seen in Figures 1 and 4.

Carried by, and extending transversely between, the conveyor chains 19, is a plurality of spaced pairs of so-called cut-away flight members 43, 43', of the type more particularly disclosed and described in my co-pending application Serial No. 242,430, each being provided along one-half of its length with a plate-like member 44 and along the other half of its length with an upstanding pusher-flange 45, and each being shaped transversely of the machine to conform to the transverse cross-sectional shape of the divider or breaker plate 22, that is to say, being of greatest height in the longitudinal center of the machine and then sloping downwardly toward the opposite sides of the machine, as best seen in Figures 3 and 4.

Now the baked unsliced bread loaves L, on moving forwardly through the slicing machine A, are first sliced and then in sliced upright loaf form progress across the delivery lip 4 between the side guide or rail extensions 33 and drop downwardly upon the divider or breaker plate 22. At this point, the loaf slices are by the plate 22 angularly upset, as it may be said and thereby divided into two angularly opposed fractions $l$, $l'$, resting respectively upon the inclined slide surfaces 23, 24, the guide or rail sections 30 being accordingly formed, as shown and described, to accommodate and engage the loaf fractions $l$, $l'$, in such sloping position and the fraction $l'$ being held obliquely upwardly by the hold-up tongue 4'. For this purpose, I have found it preferable to shape the hold-up tongue in such a manner that it is parallel to the plane of the breaker plate surface 24 to prevent accidental misalignment of the slices of the fraction $l'$. Then, a flight 43, moving upwardly from beneath the table, engages the one fraction $l$ along its pusher flange 45, and, at the same time, the blade or plate-like portion 44 of the flight rod 43 will pass freely beneath the other obliquely supported fraction $l'$, the one fraction $l$ being thus progressed forwardly away from its companion fraction $l'$. The fraction $l$, now moving or traveling forwardly, comes into engagement at its inner or crustless face with, and is held against slippage by, the inclined intermediate guide 40, such loaf fraction $l$, on being further progressed, entering the space between the flexible or switch guide 42 and an oblique side guide rail 32 and being accordingly shifted toward the center of the table 9 and ultimately traveling forwardly between the straight rail sections 31, which are in alignment with the pockets $p$ of the wrapping machine conveyor C.

In like manner, the other fraction $l'$ of the particular loaf will be engaged by the next succeeding and staggered pusher-flange 45 and progressed first between the guide 42 and opposite side guide or rail 32 and then between the rail sections 31 in consecutive alignment with the first section $l$.

A modified form of divider or breaker plate 46 is shown in Figures 5, 6, 7, and 8. Such plate 46 extends obliquely upwardly from one of the longitudinal side margins to a point approximately in the longitudinal center of the table 9 and is then flanged downwardly, as at 47, which, at its forward end, is provided with a forwardly extending flexible guide or switching member 48. In such case, the delivery lip 4 should be provided with a tongue 4'' which projects forwardly in parallelism with the plane of the conveyor table 9, as best seen in Figure 7.

The table 9 is further provided along both of its longitudinal side margins opposite the switch member 48 with lifting tracks 49 for supporting the upper run 20 of the conveyor chains 19, all as best seen in Figure 6.

Carried by, and extending transversely between, the chains 19, is a plurality of spaced pairs of so-called cut-away flights 50, 50', shaped to conform to the contour of the divider plate 46, each flight including a flat section 51, an intermediate vertically disposed section 52, and a section 53 extending obliquely downwardly from the section 52 to the adjacent longitudinal margin of the table 9 for co-operation with the breaker-plate 46. The flight member 50 of each pair is further provided along its flat section 51 with an upwardly presented pusher-flange 54 and along its oblique section 53 has the flat formation or shape of a blade or plate. On the other hand, the flight 50' of each pair is provided on its oblique section 53 with an upwardly presented pusher-flange 55 and along its flat section 51 has also the flat formation of a blade or plate, all as best seen in Figures 7 and 8 and as presently fully appearing.

The sliced baked bread loaves L', on being discharged from the delivery lip 4, fall downwardly, one fraction *f* being intercepted by the divider plate 46, and the other fraction *f'* dropping directly down upon the table 9. In such respective positions, the fractions *f*, *f'*, are restrained at their outer end by the side guide sections 30, one of which, as shown, is edgewise straight up-and-down for co-operation with the table 9. Along its inner or crustless end face, the fraction *f'* will be held in upright position by the vertically disposed flange 47 of the divider plate 46, support for the inner end of the other or obliquely disposed fraction *f* being unnecessary and being hence omitted.

Now, the loaf L' being discharged from the delivery lip 4 and divided into fractions *f*, *f'*, as described, a cut-away flight 50 moves up from beneath the table 9 and grips the loaf fraction *f'* along its pusher-flange 54 and progresses the same forwardly away from its companion fraction *f*, the inclined blade portion 53 of such flight 50 passing freely beneath the fraction *f*. Subsequently the successive flight 50', moving up from beneath the table, grips the loaf fraction *f* along its pusher-flange 55 and progresses the same first forwardly along the divider plate 46 and then to and upon the table 9.

Then the loaf fractions *f*, *f'*, having progressed forwardly away from the region of the divider plate 46, will be held between the flexible guide or switching member 48 and one or the other of the oblique intermediate side guide sections 29 and will be translated toward the center of the table 9 in substantially the same manner as previously described and as more particularly and fully disclosed in my co-pending application Serial No. 242,430.

To obviate slice loss by slipping over the blade-like portion of the pusher-guide upon being transported toward the center of the table 9, the conveyor chains 19 are caused to ride up over the lift tracks 49, thereby bodily elevating the flights 50, 50', which then function as slice pushers throughout their entire length.

It will be evident that, by my present invention, I provide a unique means of subdividing or fractionating sliced bread loaves, which is not only simple, economical, and convenient, but which may be readily applied to various different types of present bread slicing and conveying machines without necessitating any material or extensive reconstructions or adaptations thereof. In addition, the present mechanism will subdivide sliced bread loaves without damaging any of the loaf slices and does not require particularly critical adjustment with reference to the particular slice cut about which the loaf is to be subdivided.

It should be understood that changes and modifications in the form, construction, arrangement, and combination of the several parts of the machine may be made and substituted for those herein shown and described without departing from the nature and principle of my invention.

Having thus described my invention, what I claim and desire to secure by Letters Patent is:

1. A sliced bread loaf fractionating machine comprising a delivery plate for receiving the sliced loaf with the slices uprightly disposed, a conveyor, and means including a second plate having a beveled portion operatively interposed between the delivery plate and conveyor for angularly upsetting a selected portion of the loaf slices about a horizontal line substantially at right angles to the longitudinal axis of the loaf for subdividing the loaf into a plurality of fractions.

2. A sliced bread loaf fractionating machine comprising a delivery plate for receiving the sliced loaf with the slices uprightly disposed, a conveyor, and means including a second plate having oppositely disposed beveled portions operatively interposed between the delivery plate and conveyor for angularly upsetting a selected portion of the loaf slices about a horizontal line substantially at right angles to the longitudinal axis of the loaf for subdividing the loaf into a plurality of fractions.

3. A sliced bread loaf fractionating machine comprising a delivery plate for receiving the sliced loaf with the slices uprightly disposed, a conveyor, means operatively interposed between said plate and the conveyor for upsetting a selected portion of the loaf slices with respect to the remainder of the loaf for subdividing the loaf into a plurality of fractions and discharging said fractions upon the conveyor in axially spaced relation, and means for first confining the fractions to separate oblique paths of travel across the conveyor and then shifting said fractions into consecutive alignment for continued travel in a single path.

4. A sliced bread loaf fractionating machine comprising a delivery plate for receiving the sliced loaf with the slices uprightly disposed, a table, means operatively interposed between said plate and table for upsetting a selected portion of the loaf slices with respect to the remainder of the loaf for subdividing the loaf into a plurality of fractions and discharging said fractions upon the table in axially spaced relation, means for conveying said fractions over the table, and means for first confining the fractions to separate obliquely disposed paths of movement for a portion of their travel and subsequently shifting the fractions for continued travel and discharge from the table in consecutive alignment.

5. A sliced bread loaf fractionating machine comprising a delivery plate for receiving the sliced loaf with the slices uprightly disposed, a table, means including a second plate having an obliquely disposed section operatively interposed between the delivery plate and table for upsetting a selected portion of the loaf slices with respect to the remainder of the loaf for subdividing the loaf into a plurality of fractions and discharging said fractions upon the table in axially spaced relation, means for conveying said fractions over the table, and means for first confining the fractions to separate obliquely disposed paths of movement for a portion of their travel and subsequently shifting the fractions for continuous travel and discharge from the table in consecutive alignment.

6. A sliced bread loaf fractionating machine comprising a delivery plate for receiving the sliced loaf, a table, means including a second plate having oppositely disposed beveled portions operatively interposed between the delivery plate and the table for displacing a selected portion of the loaf slices with respect to the remainder of the loaf for subdividing the loaf into a plurality of fractions and discharging said fractions upon the table in axially spaced relation, means for conveying said fractions over the table, and means for initially confining the fractions to separate paths of movement and subsequently shifting the fractions into consecutive alignment along a single path of movement during travel over the table.

7. A bread loaf slicing and fractionating machine comprising slicing means, a delivery plate disposed on the discharge side of the slicing means for receiving the sliced loaf, a table, means including a second plate having oppositely disposed beveled portions operatively interposed between the delivery plate and the table for displacing a selected portion of the loaf slices with respect to the remainder of the loaf for subdividing the loaf into a plurality of fractions and discharging said fractions upon the table in axially spaced relation, means for conveying said fractions over the table, and means for initially confining the fractions to separate paths of movement and subsequently shifting the fractions into consecutive alignment along a single path of movement during travel over the table.

8. A bread loaf slicing and fractionating machine comprising slicing means, a delivery plate disposed on the discharge side of the slicing means for receiving the sliced loaf, a table, means including a second plate having oppositely disposed beveled portions operatively interposed between the delivery plate and the table for displacing a selected portion of the loaf slices with respect to the remainder of the loaf for subdividing the loaf into a plurality of fractions and discharging said fractions upon the table in axially spaced relation, conveying means including staggered pusher members for shifting said fractions over the table, and means for initially confining the fractions to separate paths of movement and subsequently shifting the fractions into consecutive alignment along a single path of movement during travel over the table.

9. A sliced bread loaf fractionating conveyor including a pair of spaced chains, a plurality of flight bars mounted at their ends on and extending transversely between the chains, said flight bars being adapted to engage and progress a fraction of a sliced loaf along a portion of their length only, guide means for shifting each loaf fraction longitudinally of the flight bar by which it is being progressed, and track means substantially co-extensive with the guide means for elevating the flight bars for loaf-progressing engagement along their entire length.

10. A sliced bread loaf fractionating conveyor including a pair of spaced chains, a plurality of flight bars mounted at their ends on and extending transversely between the chains, said flight bars being adapted to engage and progress a fraction of a sliced loaf along a portion of their length only, guide means for shifting each loaf fraction longitudinally of the flight bar by which it is being progressed, and track means substantially co-extensive with the guide means for elevating the flight bars for loaf-progressing engagement along their entire length as the loaf fraction begins to shift and maintaining the flight bars in such elevated position during the remainder of loaf-progressing movement.

11. In a bread loaf slicing and fractionating mechanism, slicing means, a delivery plate mounted adjacent the slicing means for receiving the sliced loaves, a conveyor table, means for moving the loaves across the conveyor table, and a breaker plate interposed between the conveyor table and the delivery plate for receiving the sliced bread loaves as they drop from the end of the delivery plate, said breaker plate having an upwardly presented ridge extending substantially in the direction of loaf movement for causing the loaf to break open into two separate fractions as it comes to rest upon the breaker plate.

12. In a bread loaf slicing and fractionating mechanism, slicing means, a delivery plate mounted adjacent the slicing means for receiving the sliced loaves, a conveyor table, a breaker plate interposed between the conveyor table and the delivery plate for receiving the sliced bread loaves as they drop from the end of the delivery plate, said breaker plate having an upwardly presented ridge extending in substantial alignment with a slice-cut and in the direction of loaf travel for causing the loaf to break open into two separate fractions as it comes to rest upon the breaker plate, and means movable first over the breaker plate and thence over the conveyor table for shifting the loaf fractions from the breaker plate onto and across the conveyor table.

13. In a bread loaf slicing and fractionating mechanism, slicing means, a delivery plate mounted adjacent the slicing means for receiving the sliced loaves, a conveyor table, a breaker plate interposed between the conveyor table and the delivery plate for receiving the sliced bread loaves as they drop from the end of the delivery plate, said breaker plate having an upwardly presented ridge extending in substantial alignment with a slice-cut and in the direction of loaf travel for causing the loaf to break open into two separate fractions as it comes to rest upon the breaker plate, and means movable first over the breaker plate and thence over the conveyor table for shifting the loaf fractions from the breaker plate onto and across the conveyor table, said means including a plurality of flight rods having a longitudinal shape complementary to the contour of the breaker plate.

14. In a bread loaf slicing and fractionating mechanism, slicing means, a delivery plate mounted adjacent the slicing means for receiving the sliced loaves, a conveyor table extending longitudinally outwardly from the delivery plate, and a breaker plate interposed between the conveyor table and the delivery plate for receiving the sliced bread loaves as they drop from the end of the delivery plate, said breaker plate resting along its one lateral margin upon, and extending longitudinally along, the conveyor table and at its other lateral margin being in substantial alignment with a slice-cut and provided with a flange for supporting the plate obliquely over the conveyor table.

15. A sliced bread loaf fractionating machine comprising slicing means having a delivery plate at its discharge end for receiving the sliced bread loaves passing through the slicing means, loaf conveying means spaced downwardly from the delivery plate, means for progressing bread loaves through the slicing means and across the delivery plate whereby to cause the sliced bread loaves to fall intermittently from the delivery plate toward the conveyor, and means interposed between the delivery plate and the conveying means for catching the falling loaf said means including surfaces oblique with respect to each other and intersecting along substantially in alignment with a selected slice-cut for parting the loaf into a plurality of fractions as it comes to rest thereon.

16. A sliced bread loaf fractionating machine comprising slicing means having a delivery plate at its discharge end for receiving the sliced bread loaves passing through the slicing means, loaf conveying means spaced downwardly from the delivery plate, means for progressing bread loaves through the slicing means and across the delivery plate whereby to cause the sliced bread loaves to fall intermittently from the delivery plate toward the conveyor, means interposed between the delivery plate and the conveying means for catching the falling loaf said means including surfaces oblique with respect to each other and intersecting along substantially in alignment with a selected slice-cut for parting the loaf into a plurality of fractions as it comes to rest thereon, and means associated with the conveying means for pushing the several fractions from the plate one behind the other.

17. A sliced bread loaf fractionating machine comprising slicing means having a delivery plate at its discharge end for receiving the sliced bread loaves passing through the slicing means, a conveyor table spaced downwardly from the delivery plate, means for progressing bread loaves through the slicing means and across the delivery plate whereby to cause the sliced bread loaves to fall intermittently from the delivery plate toward the conveyor, and a bent plate interposed between the conveyor table and the delivery plate for catching the falling loaf said bent plate having a substantially straight margin disposed in substantial alignment with a selected slice-cut for causing the loaf to come to rest in spaced fractions.

18. A sliced bread loaf fractionating machine comprising slicing means having a delivery plate at its discharge end for receiving the sliced bread loaves passing through the slicing means, a conveyor table spaced downwardly from the delivery plate, means for progressing bread loaves through the slicing means and across the delivery plate whereby to cause the sliced bread loaves to fall intermittently from the delivery plate toward the conveyor, and a bent plate interposed between the conveyor table and the delivery plate for catching the falling loaf said bent plate having a substantially straight margin disposed in substantial alignment with a selected slice-cut for causing the loaf to come to rest in fractions at least one of which is disposed obliquely to the plane of the conveyor table.

19. A sliced bread loaf fractionating machine comprising a slicing means having a delivery plate at its discharge end for receiving the sliced bread loaves passing through the slicing means, a conveyor table spaced downwardly from the delivery plate, means for progressing bread loaves through the slicing means and across the delivery plate whereby to cause the sliced bread loaves to fall intermittently from the delivery plate toward the conveyor, and an oblique plate extending upwardly across the conveyor table transversely to the line of travel of the bread-loaves and terminating within the confines of the path of travel of the bread-loaves, said plate being interposed between the conveyor table and the delivery plate for catching a portion of the falling loaf and holding such portion up from the conveyor table whereby to subdivide the loaf into a plurality of fractions.

20. A sliced bread loaf fractionating machine comprising slicing means having a delivery plate at its discharge end for receiving the sliced bread loaves passing through the slicing means, a conveyor table spaced downwardly from the delivery plate, means for progressing bread loaves through the slicing means and across the delivery plate whereby to cause the sliced bread loaves to fall intermittently from the delivery plate toward the conveyor, a bent plate interposed between the conveyor table and the delivery plate for catching the falling loaf said bent plate having a substantially straight margin disposed in substantial alignment with a selected slice-cut for causing the loaf to come to rest in spaced fractions, and a plurality of chain-driven flight rods longitudinally bent to conform to the transverse contour of the bent plate for shifting the loaf fractions from the bent plate to, and progressing said fractions along, the conveyor table.

21. A sliced bread loaf fractionating machine comprising slicing means having a delivery plate at its discharge end for receiving the sliced bread loaves passing through the slicing means, a conveyor table spaced downwardly from the delivery plate, means for progressing bread loaves through the slicing means and across the delivery plate whereby to cause the sliced bread loaves to fall intermittently from the delivery plate toward the conveyor, a bent plate interposed between the conveyor table and the delivery plate for catching the falling loaf, said bent plate having a substantially straight margin disposed in substantial alignment with a selected slice-cut for causing the loaf to come to rest in spaced fractions, and a plurality of chain-driven flight rods longitudinally bent to conform to the transverse contour of the bent plate and each provided for a portion of its length with an upstanding flange for shifting a selected loaf fraction from the bent plate onto and along the conveyor table.

22. A sliced bread loaf fractionating machine comprising slicing means having a delivery plate at its discharge end for receiving the sliced bread loaves passing through the slicing means, a conveyor table spaced downwardly from the delivery plate, means for progressing bread loaves through the slicing means and across the delivery plate whereby to cause the sliced bread loaves to fall intermittently from the delivery plate toward the conveyor, a bent plate interposed between the conveyor table and the delivery plate for catching the falling loaf, said bent plate having a substantially straight margin disposed in substantial alignment with a selected slice-cut for causing the loaf to come to rest in spaced fractions, and means for shifting the loaf fractions from the bent plate onto and along the conveyor table.

23. A sliced bread loaf fractionating machine comprising slicing means having a delivery plate at its discharge end for receiving the sliced bread loaves passing through the slicing means, a conveyor table spaced downwardly from the delivery plate, means for progressing bread loaves through the slicing means and across the delivery plate whereby to cause the sliced bread loaves to fall intermittently from the delivery plate toward the conveyor, a bent plate interposed between the conveyor table and the delivery plate for catching the falling loaf, said bent plate having a substantially straight margin disposed in substantial alignment with a selected slice-cut for causing the loaf to come to rest in spaced fractions, means for shifting the loaf fractions from the bent plate onto and along the conveyor table, and means disposed over the plate for entering the space between the loaf fractions as the latter are shifted from the bent plate and thereby maintaining separation between the fractions as they move onto the conveyor table.

24. A slicer bread loaf fractionating machine comprising a conveyor table, means for feeding the sliced loaf over the delivery plate with the slice-cuts of said loaf disposed in substantial parallelism with the longitudinal axis of the table, a breaker plate extending over the conveyor table and being disposed in a plane oblique to the plane of the conveyor table and having an upwardly presented margin parallel to the longitudinal axis of the table, and a delivery plate for receiving the sliced loaf extending transversely across and above the upwardly presented margin of the breaker plate for positioning the loaf in straddle-wise relation to the upwardly presented margin of the breaker plate.

25. A sliced loaf fractionating conveyor including a table-like member having a surface for slidably supporting the loaves, a pair of spaced chains trained over said loaf-supporting surface, a plurality of flight bars mounted at their ends on and extending transversely between the chains, said flight bars being shaped for loaf progressing engagement normally along only a portion of their length, and a pair of track members disposed under the chains and having a length substantially shorter than the length of the table for shifting the flight bars with respect to the loaf-supporting surface of the table during the course of loaf-progressing travel for rendering said flight bars effective for loaf-progressing engagement substantially throughout their entire length.

26. A sliced loaf fractionating conveyor including a table-like member having a surface for slidably supporting the loaves, a pair of spaced chains trained over said loaf-supporting surface, a plurality of flight bars mounted at their ends on and extending transversely between the chains, said flight bars being shaped for loaf-progressing engagement normally along only a portion of their length, and means positioned for engagement with the chains for only a portion of their travel over the table for shifting the flight bars with respect to the loaf-supporting surface of the table during the course of loaf-progressing travel for rendering said flight bars effective for loaf-progressing engagement substantially throughout their entire length.

27. A sliced bread loaf fractionating machine comprising, a conveyor table, a breaker plate extending over the conveyor table and being disposed in a plane oblique to the plane of the conveyor table and having an elevated margin substantially parallel to the longitudinal axis of the conveyor table, said breaker plate being bent downwardly at its elevated margin in the provision of a leg for the plate supporting engagement on the conveyor table, and a delivery plate for receiving the sliced loaf extending transversely across and above the leg supported end of the breaker plate for positioning the sliced loaf above the breaker plate with a slice-cut in substantial alignment with the elevated margin of said plate, and means for moving the positioned loaf from the delivery plate to the breaker plate.

GUSTAV C. PAPENDICK.